(12) United States Patent
Peterson et al.

(10) Patent No.: US 8,042,576 B2
(45) Date of Patent: Oct. 25, 2011

(54) MECHANICAL CLEAN-OUT TEST PLUG

(75) Inventors: Stephen Peterson, Chaska, MN (US); Richard Larson, Victoria, MN (US)

(73) Assignee: IPS Corporation, Collierville, TN (US)

( * ) Notice: Subject to any disclaimer, the term of this patent is extended or adjusted under 35 U.S.C. 154(b) by 342 days.

(21) Appl. No.: 12/411,969

(22) Filed: Mar. 26, 2009

(65) Prior Publication Data

US 2010/0243090 A1    Sep. 30, 2010

(51) Int. Cl.
*F16L 55/10* (2006.01)
(52) U.S. Cl. .................. 138/90; 138/89; 138/94; 138/93
(58) Field of Classification Search .................... 138/89, 138/90, 94, 92
See application file for complete search history.

(56) References Cited

U.S. PATENT DOCUMENTS

| | | | | | |
|---|---|---|---|---|---|
| 2,588,188 | A | * | 3/1952 | Weisman | 138/89 |
| 3,291,156 | A | | 12/1966 | Corsano | 138/89 |
| 3,457,959 | A | * | 7/1969 | Cooper | 138/90 |
| 3,494,504 | A | | 2/1970 | Jackson | 138/89 |
| 3,613,936 | A | | 10/1971 | Kaiser et al. | 220/237 |
| 3,667,640 | A | | 6/1972 | Morrow | 220/235 |
| 4,040,450 | A | * | 8/1977 | Boundy | 138/94 |
| 4,202,377 | A | * | 5/1980 | Harrison | 138/94 |
| 4,303,101 | A | | 12/1981 | Tholen | 138/89 |
| 4,312,708 | A | | 1/1982 | Leslie | 376/203 |
| 4,381,800 | A | * | 5/1983 | Leslie | 138/90 |
| 4,493,344 | A | | 1/1985 | Mathison et al. | 138/89 |
| 4,542,642 | A | | 9/1985 | Tagliarino | 138/90 X |
| 4,585,033 | A | | 4/1986 | Westman | 138/89 |
| 4,614,206 | A | | 9/1986 | Mathison et al. | 138/93 |
| 4,820,474 | A | | 4/1989 | Leslie et al. | 138/89 X |
| 5,035,266 | A | | 7/1991 | Benson et al. | 138/92 |
| 5,076,328 | A | | 12/1991 | Lyon | 138/93 |
| 5,209,266 | A | | 5/1993 | Hiemsoth | 138/90 |
| 5,234,034 | A | | 8/1993 | Lyon | 138/93 |
| 5,348,085 | A | | 9/1994 | Benson | 166/92.1 |
| 5,353,841 | A | | 10/1994 | Mathison et al. | 138/93 |
| 5,771,937 | A | | 6/1998 | Collins | 138/93 |
| 6,116,286 | A | | 9/2000 | Hooper et al. | 138/93 |

(Continued)

OTHER PUBLICATIONS

G.T. Water Products, Inc.; SAFE-T-SEAL Test Plugs product information (5 pgs.) http://www.gtwaterproducts.com/safe.html (cited visited Nov. 7, 2008).

(Continued)

*Primary Examiner* — Patrick F Brinson
(74) *Attorney, Agent, or Firm* — Alston & Bird LLP (57) ABSTRACT

The present invention provides a test plug for use with a clean-out that extends at an angle from a pipe section of a pipe system. In general, the test plug includes a sealing assembly that is actuated by an actuating member extending at an angle from the sealing assembly. The sealing assembly includes a first plate, a second plate, a valve that is configured to draw the first and second plates together, and a ring-shaped sealing member located between the first and second plates. In various embodiments, the actuating member is configured to move the valve between an open position, in which test media may be communicated through at least one opening in the first plate and through at least one opening in the second plate, and a closed position, in which the valve seals the opening of the first plate and in which the sealing member extends outwardly to seal against an internal surface of the pipe section.

16 Claims, 4 Drawing Sheets

U.S. PATENT DOCUMENTS

| | | | |
|---|---|---|---|
| 6,502,603 B2 | 1/2003 | Lane, Jr. | 138/89 |
| 6,513,549 B2 | 2/2003 | Chen | 138/89 |
| 7,021,337 B2 | 4/2006 | Markham | 138/90 |
| 7,325,574 B1 | 2/2008 | Beckey | |
| 7,866,347 B2 * | 1/2011 | Bowie | 138/94 |

OTHER PUBLICATIONS

G.T. Water Products, Inc.; New Innovations (2 pgs.) http://www.gtwaterproducts.com/new.html (cited visited Nov. 7, 2008).

Cherne Industries Inc.; Pneumatic Plugs—Single-Size Test-Ball® (¾" through 6") product information (1 pg.) www.cherneind.com.
Cherne Industries Inc.; Pneumatic Plugs—Single-Size Test-Ball® (8" through 12") product information (1 pg.) www.cherneid.com.
Cherne Industries Inc.; Pneumatic Plugs—Clean-Seale® Plugs product information (1 pg.) www.cherneind.com.
Cherne Industries Inc.; Pneumatic Plugs—Long Test-Ball® & MS2® Test-Ball product information (1 pg.) www.cherneind.com.
IPS Corporation; Multi-Size Pneumatic Pipe Plugs product information (1 pg).

* cited by examiner

MECHANICAL CLEAN-OUT TEST PLUG

FIELD OF THE INVENTION

The present invention relates to plug devices for use in pipe systems, and more particularly to test plug devices for sealing pipes or conduits at clean-out connections.

BACKGROUND OF THE INVENTION

Pipe or plumbing systems often include access openings or ports that allow the interior of the pipes of the pipe system to be inspected, cleaned, and/or tested. Access opening configurations for such pipe systems can vary in size and shape, although many configurations are standardized. In one common configuration, one or more access openings (often referred to as "clean-outs") are provided of cylindrical pipe that extends away from the axis of the main pipe section. Clean-outs may extend from a main pipe section at any angle. Those that extend approximately 90 degrees from the main pipe section are commonly called "clean-out tees" (referring to the T-shape created by the intersecting pipe sections).

Clean-outs are also used to access areas of the pipe system in order to test the integrity of the pipe system. Currently, this is accomplished by placing temporary test plugs in the clean-outs or other portions of the pipe system accessible through the clean-outs. A test media, such as a liquid or gaseous material (typically water or air) is then introduced into the pipe system for a period of time to determine if there are any leaks. After successful testing, the test plugs are removed. Existing test plugs can be categorized into mechanical plugs and pneumatic plugs. Mechanical test plugs include devices that seal pipe systems via mechanical activation, such as by turning a threaded connection member to expand an elastomeric ring that seals against an inner surface of a pipe section. Pneumatic plugs include elongate elastomeric bladders that are attached directly to an air source. The bladders are inserted into the pipe system through the clean-outs or other access points and are then inflated to seal the pipe section. After testing, the test plugs are deflated or deactivated and then removed from the pipe system.

In some instances, existing pneumatic and mechanical plugs can present unpleasant conditions for a user. For example, to test a vertical pipe system having a clean-out tee, a common procedure includes inserting a pneumatic test plug through the access opening and into the pipe section above the clean-out, where it is inflated to seal a portion of the pipe section. Another common procedure includes inflating a pneumatic test plug in the access port of the clean-out tee so that it spans across the clean-out to seal a portion of the pipe section. Regardless of which type of test plug is used, the plugs are often subjected to extremely high pressures from the test media. It is not uncommon for a test plug to have several stories of water directly above the plug in the pipe section. Properly sealing and safely releasing such a large head pressure is a problem for many of these test plugs. For example, releasing the pressure using a test plug of the first type may force the test plug downward and spray the test media out through the access port. Test plugs of the second type may have great difficulty sealing many types of clean-out fittings because of varying types of surfaces on the inner surface of pipes and because of the limited sealing areas. Additionally, test plugs of both types may lose air pressure prior to or during a test.

As a result, there is a need for an improved test plug for use in sealing a pipe-section having a clean-out where the clean-out extends at an angle from the pipe section. The improved test plug should be capable of mechanically sealing the pipe section and blocking test media from other portions of the pipe section. It should also be capable of safely releasing test media into other portions of the pipe section. Various embodiments of the test plug should also be capable of sealing pipe sections with clean-outs that extend at various angles from the pipe section. Additionally, the improved test plug should be easy to use.

BRIEF SUMMARY OF VARIOUS EMBODIMENTS

The present invention addresses the above needs and achieves other advantages by providing a test plug for use with a clean-out that defines a clean-out axis, the clean-out extending at an angle from a pipe section that defines a pipe section axis, the pipe section further defining an internal surface. In general, the test plug includes a first plate having a top surface defining an opening, a second plate having a bottom surface defining an opening, a compressible ring-shaped sealing member defining a perimeter contact surface, the sealing member located between the first and second plates, a valve defining a valve end, the valve being configured to move along a valve axis within the opening defined in the top surface of the first plate, and an actuating member coupled to the valve and configured to move along an actuating member axis. The actuating member axis extends at an angle from the valve axis, and the actuating member is configured to move the valve between an open position, in which test media may be communicated through the opening in the first plate and through the opening in the second plate, and a closed position, in which the valve end seals the opening of the first plate and draws the first and second plates together such that the sealing member is compressed between the first and second plates and extends outwardly to seal against the internal surface of the pipe section.

In some embodiments, the valve axis substantially aligns with the pipe section axis and the actuating member axis substantially aligns with the clean-out axis. Some embodiments further comprise a lever configured to couple the actuating member to the valve such that linear motion of the actuating member along the actuating member axis imparts linear motion of the valve along the valve axis. In some embodiments, the lever defines a first end configured to engage the valve and a second end configured to engage the actuating member, and the lever is further configured to rotate about a lever axis. In some embodiments, at least one of the valve and the actuating member includes cam surfaces configured to contact the respective first or second ends of the lever. In some embodiments, each of the first plate and the second plate includes a radially disposed angled contact surface that is axially tapered, the compressible ring-shaped sealing member is located between the angled contact surfaces of the first and second plates, and when the first and second plates are drawn together the sealing member is compressed between the angled contact surfaces. In some embodiments, the valve end defines a countersunk profile and the opening defined in the top surface of the first plate is configured to receive the countersunk valve end. In some embodiments, the actuating member axis extends approximately 90 degrees from the valve axis. In some embodiments, the sealing member is constructed of an elastomeric material.

Some embodiments further comprise an angled connection member that defines a first portion and a second portion, wherein the first portion defines a first end that is rigidly attached to the second plate, and the actuating member travels within an opening extending through at least a portion of the second portion of the connection member. In some embodiments, one end of the actuating member defines a portion that is configured to receive a threaded device, and the threaded device is configured when rotated to move the actuating member along the actuating member axis. Some embodiments further comprise a cap configured to seal the clean-out. In some embodiments, the cap defines an opening extending through the cap, the second portion of the connection member further defines an outer surface, and the cap is configured to slide along at least a portion of the outer surface of the second portion of the connection member. In some embodiments, the clean-out defines an inner surface, a portion of which is threaded, and the cap is configured to screw into the threaded portion to seal the clean-out. In some embodiments, a cap sealing member is located proximate the opening of the cap, and the cap sealing member is configured to seal the outer surface of the second portion of the connection member. In some embodiments, the cap sealing member comprises an o-ring constructed of a natural rubber material.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

Figure 1:
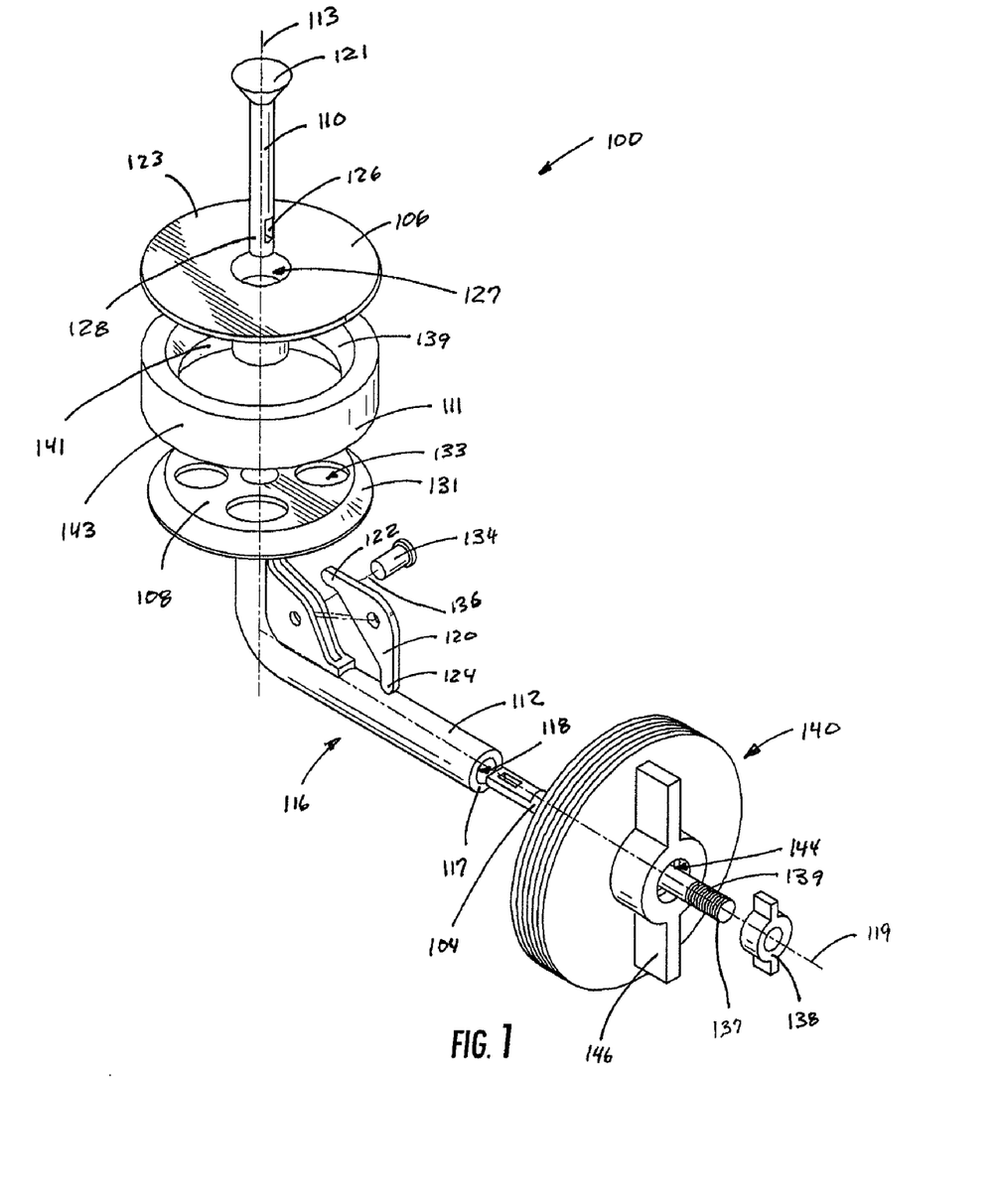
FIG. 1 is an exploded perspective view of a mechanical test plug in accordance with one exemplary embodiment of the invention.

FIG. 1 shows an exploded perspective view of a mechanical test plug 100 in accordance with one exemplary embodiment of the present invention. In general, the mechanical test plug 100 of the depicted embodiment includes a sealing assembly 102 that is coupled to an actuating member 104. In various embodiments, the mechanical test plug 100 is configured to be inserted through a clean-out access port into a pipe section so that a portion of the pipe section may be sealed for testing. In the depicted embodiment, the actuating member 104 is configured to extend at an angle from the sealing assembly 102 so that the portion of the pipe section may be sealed by actuating the actuating member 104 through the clean-out access port. Although the depicted embodiment is configured to seal a portion of a pipe section having a clean-out that extends at an approximate 90 degree angle from the pipe section (i.e., a clean-out tee), in various other embodiments a mechanical test plug may be configured to seal a portion of a pipe section that has a clean-out that extends at any angle from the pipe section.

In the depicted embodiment, the sealing assembly 102 includes a first plate 106, a second plate 108, a valve 110, and a ring-shaped sealing member 111 located between the first plate 106 and the second plate 108. The valve 110 of the depicted embodiment defines a valve end 121 and is configured to move along valve axis 113. In the depicted embodiment, the sealing member 111 includes angled contact surfaces 139 and 141 and a perimeter contact surface 143. The first plate 106 includes a top surface 123 and a radially disposed angled contact surface 125 (not visible in FIG. 1) that is axially tapered. The top surface also defines an opening 127 that extends through the first plate 106. In various embodiments, the valve 110 is configured to travel within the opening 127. The second plate 108 includes a bottom surface 129 (not visible in FIG. 1) and a radially disposed angled contact surface 131 that is axially tapered. A plurality of openings 133 are defined in the bottom surface 129 and extend through the second plate 108. When the valve 110 is in an open position, test media may be communicated through the opening 127 in the first plate 106 and the openings 133 in the second plate 108.

In the depicted embodiment, the angled contact surfaces 125, 131 of the first and second plates 106, 108 are configured to contact the respective angled contact surfaces 139, 141 of the sealing member 111, such that when the valve 110 is in a closed position the first and second plates 106, 108 compress the sealing member 111, so that it expands outwardly and the perimeter contact surface 143 may seal an internal surface of the pipe section. It should be noted that in other embodiments any one, or any combination of the first plate 106, the second plate 108, the valve 110, or the sealing member 111 may have other designs that are configured such that when the first and second plates 106, 108 are drawn together, the sealing member 111 expands outwardly. For example, in some embodiments, the sealing member 111 may be an o-ring that expands when compressed between the first and second plates 106, 108. In the depicted embodiment, the first plate 106, second plate 108, and valve 110 are constructed of a rigid plastic material, such as acrylonitrile butadiene styrene (ABS), however in other embodiments any one or any combination of these features may be constructed of other materials including, but not limited to, other rigid plastic materials, metal materials, composite materials, and combinations thereof. Additionally, in the depicted embodiment the sealing member 111 is constructed of an elastomeric neoprene rubber material, however in other embodiments the sealing member 111 may be constructed of any other material that is configured to expand when compressed between the first and second plates 106, 108.

The mechanical test plug 100 also includes an angled connection member 112 that comprises a first portion 114 defining a first end 115 (not visible in FIG. 1) and a second portion 116 defining a second end 117. In the depicted embodiment, the angled connection member 112 is constructed of a die cast aluminum material, however in other embodiments it may be constructed of other materials including, but not limited to, other metal materials, plastic materials, composite materials, and combinations thereof. In the depicted embodiment, the first end 115 is rigidly attached to the second plate 108, and the second end 117 defines an opening 118 that extends through at least a portion of the angled connection member 112. Although in various embodiments the first end 115 may be rigidly attached to the second plate 108 in a variety of ways, including, but not limited to, the use of welds, adhesives, or fasteners, in the depicted embodiment the first end 115 is threaded and is received by a threaded portion of the second plate 108. In various embodiments, the opening 118 of the angled connection member 112 receives the actuating member 104 such that the actuating member 104 may slide along an actuating member axis 119 within the second portion 116 of the angled connection member 112. In the depicted embodiment, the second portion 116 of the angled connection member 112 extends at an approximate angle of 90 degrees with respect to the first portion 114. In such a manner, the mechanical test plug 100 of the depicted embodiment may be used in a pipe section having an access port defined by a standard clean-out tee. As noted above, however, in various other embodiments the mechanical test plug 100 may be configured to seal a portion of a pipe section that has a clean-out that extends at any angle from the pipe section. As such, in some embodiments the second portion 116 of the angled connection member 112 may extend at an angle from the first portion 114 that corresponds to an angle at which the clean-out extends from the pipe section. Additionally, in other embodiments the angle between the second portion 116 and the first portion 114 of the angled connection member 112 may be adjustable so as to accommodate sealing a portion of various pipe sections that have clean-outs that extend at various angles therefrom.

In the depicted embodiment, the actuating member 104 of the mechanical test plug 100 is an elongate shaft constructed of an aluminum material, however in other embodiments the actuating member 104 may have other configurations and may be constructed of other materials, including, but not limited to, other metal materials, plastic materials, composite materials, or combinations thereof. In the depicted embodiment, the actuating member 104 is coupled to the valve 110 with a lever 120. In particular, the lever 120 defines a first end 122 and a second end 124. The first end 122 of the lever 120 is configured to insert into a slot 126 defined in a bottom end 128 of the valve 110, and the second end 124 of the lever 120 is configured to insert into a slot 130 defined on one end 132 of the actuating member 104. In the depicted embodiment, the lever 120 is secured to the angled connection member 112 with a pin 134 that allows the lever 120 to rotate about a lever axis 136. In such a manner, linear motion of the actuating member 104 along the actuating member axis 119 imparts linear motion to the valve 110 along the valve axis 113. It should be noted that in other embodiments, the lever 120 may be coupled to one or both of the actuating member 104 or the valve 110 in another manner, such as, for example, through hinged and/or sliding connections.

As also shown in the figure, a threaded portion 137 is located on an opposite end 139 of the actuating member 104 and is configured to accept a threaded device 138. In various embodiments, the threaded device 138 is configured to move the actuating member 104 along the actuating member axis 119. In the depicted embodiment, the threaded device 138 is a threaded wing nut that is configured to screw onto the threaded portion 137 of the actuating member 104 such that it abuts the second end 17 of the angled connection member 112. In such a manner the threaded device 138 may be rotated in either rotational direction to slide the actuating member 104 in either direction along the actuating member axis 119. It should be noted that although the actuating member 104 of the depicted embodiment of the present invention is an elongate shaft that couples to the valve 110 via a lever 120, in other embodiments the actuating member 104 may be any device or combination of devices that is configured such that linear motion of the actuating member 104 along the actuating member axis 119 imparts linear motion to the valve 110 along the valve axis 113. As such, in some embodiments a lever 120 need not be included. For example, in some embodiments, the actuating member 104 may comprise a flexible shaft that couples to the valve 110, or, in some embodiments, acts as the valve. In other embodiments, the actuating member 104 may include a gear assembly, such as one or more rack and pinion assemblies.

As shown in the figure, the mechanical test plug 100 of the depicted embodiment also includes a cap 140. The cap 140 is configured to seal the access port defined by the clean-out while allowing the end 139 of the actuating member 104 and the threaded device 138 to extend through the cap 140 so that it is accessible by an operator. In the depicted embodiment, the cap 140 is constructed of a rigid plastic material, such as acrylonitrile butadiene styrene (ABS), however in other embodiments the cap 140 may be constructed of other materials including, but not limited to, other rigid plastic materials, metal materials, composite materials, and combinations thereof. The cap 140 also includes an opening 144 that extends through the cap 140 and that is configured to slide over an outer surface of the angled connection member 112. The cap 140 of the depicted embodiment also includes a pair of flanges 146 configured to facilitate threading the cap 140 into the threaded portion of the clean-out.

Figure 2:
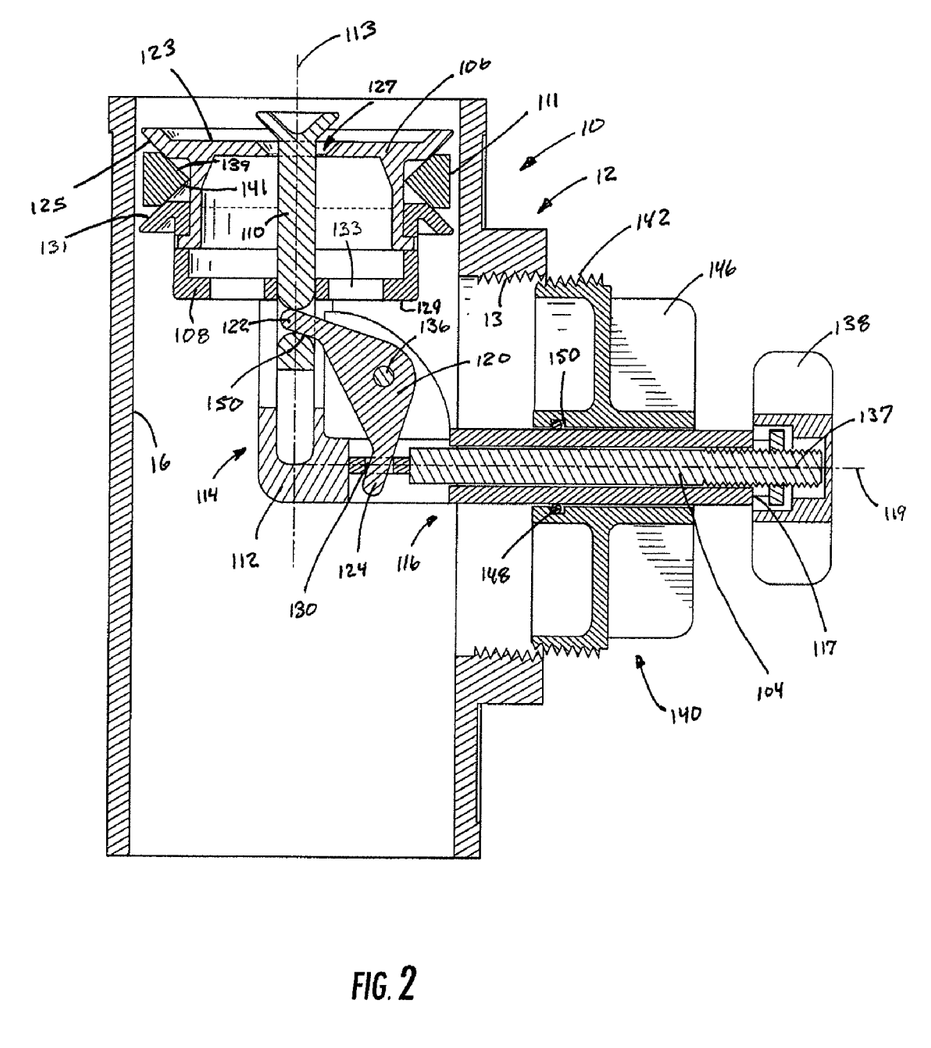
FIG. 2 is a cross-section view of a mechanical test plug installed in a pipe-section having a clean-out in accordance with one exemplary embodiment of the present invention.

FIG. 2 depicts a cross-section view of an exemplary embodiment of a mechanical test plug 100 with the valve 110 shown in an open position. The mechanical test plug 100 is shown installed in a pipe-section 10 that defines an internal wall 16 and that includes a clean-out tee 12 that has a threaded portion 13 and an access port 14. In the depicted embodiment, the angled connection member 112 positions the pipe sealing assembly 102 in a portion of the pipe section 10 above the clean-out tee 12. In the open position, the actuating member 104 positions the valve 110 such that the valve end 121 of is located above the first plate 106. Because no force is exerted on the first plate 106, the respective contact surfaces 125, 131 of the first and second plates 106, 108 are spaced apart from each other and thus the sealing member 111 is in a relaxed condition, allowing the sealing assembly 102 to be inserted into the pipe section 110.

Figure 3:
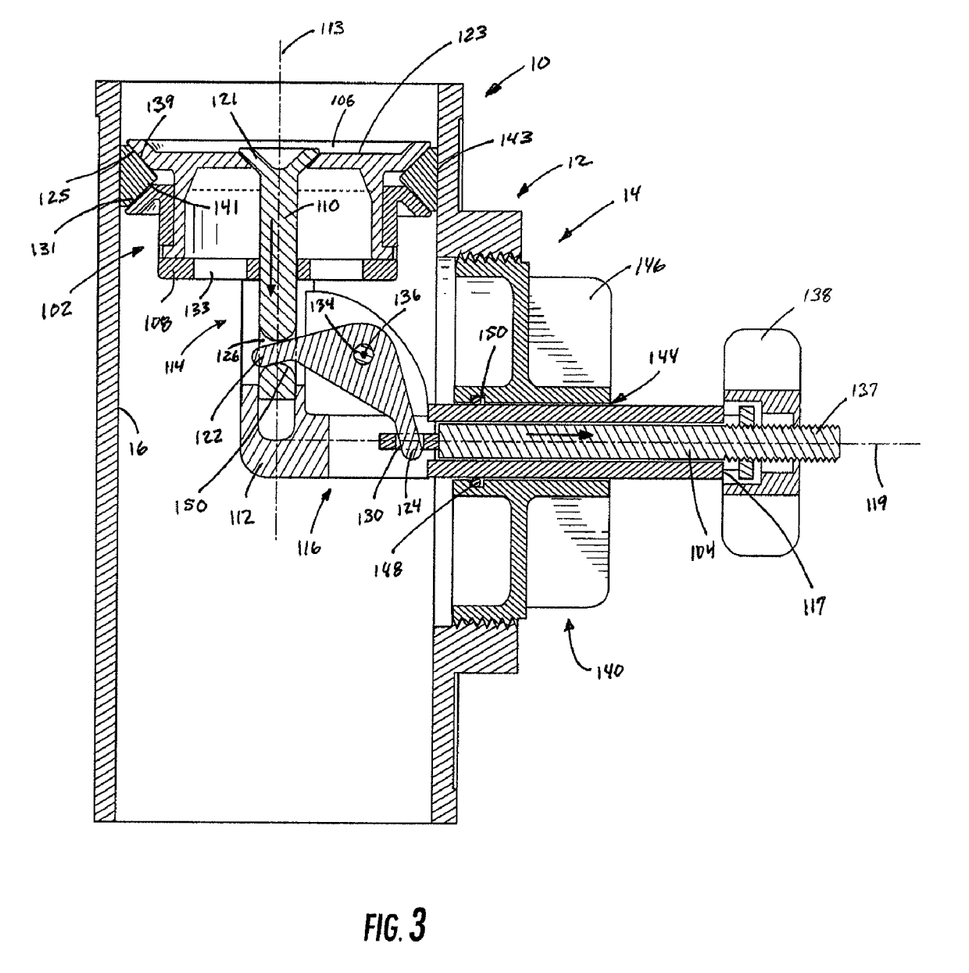
FIG. 3 is a cross-section view of the mechanical test plug of FIG. 2 shown in a closed position in accordance with one exemplary embodiment of the present invention.

FIG. 3 is a cross-section view of the mechanical test plug of FIG. 2 with the valve 110 shown in a closed position in accordance with one exemplary embodiment of the present invention. To move the valve 110 to a closed position, the threaded device 138 is rotated such that the actuating member 104 slides to the right along the actuating member axis 119 inside the angled connection member 112. Because the second end 124 of the lever 120 is inserted into the slot 130 defined in the actuating member 104, and because the lever 120 is anchored by the pin 134, when the actuating member 104 is caused to slide along the actuating member axis 119 to the right, the lever 120 rotates in a counterclockwise direction about lever axis 136. Because the first end 122 of the lever 120 is inserted into the slot 126 defined in the valve 110, the counter-clockwise rotation of the lever 120 about lever axis 136 causes the valve 110 to move downward along the valve axis 113, as oriented in the depicted embodiment. In the depicted embodiment, the first end 122 of the lever 120 slides along opposing cam surfaces 150 that are located in the slot 126 of the valve 110 of the depicted embodiment. Although other embodiments of the present invention need not include cam surfaces 150, cam surfaces 150 may tend to provide smoother movement of the valve 110 along the valve axis 113. It should also be noted that in some embodiments, the slot 130 of the actuating member 104 may also include one or more cam surfaces.

As the valve 110 moves downward along valve axis 113, the valve end 121 seals the opening 127 defined in the top surface 123 of the first plate 106. In the depicted embodiment, the valve end 121 is a countersunk valve end that has a v-shaped profile and the opening 127 has a corresponding countersunk profile that is configured to receive the countersunk valve end 121 such that the valve end 121 is relatively flush with the top surface 123 of the first plate 106 and the opening 127 is sealed. As the actuating member 104 continues to move along the actuating member axis 119 to the right, the valve end 121 draws the first plate 106 toward the second plate 108. As the first plate 106 is drawn toward the second plate 108, the sealing member 111 is compressed between the respective contact surfaces 125, 131 of the first and second plates 106, 108. Specifically, in the depicted embodiment, the angled contact surfaces 125, 131 compress the respective angled contact surfaces 139, 141 of the sealing member 111, and as such, the sealing member 111 expands outwardly such that the perimeter contact surface 143 seals against the internal wall 16 of the pipe section 10, as shown in the figure. It should be noted that in other embodiments, any other configuration is possible wherein the valve 110 seals the opening 127 and draws the first plate 106 toward the second plate 108. As such, in other embodiments the valve end 121 and the opening 127 need not have countersunk profiles, and the valve end 121 need not be flush with the top surface 123 of the first plate 106 in the closed position. For example, in some embodiments the valve end 121 may have a larger rectangular profile that seals an opening 127 having a cylindrical profile. In some embodiments the valve 110 and/or the opening 127 may also include a sealing member that facilitates sealing of the opening 127.

The depicted embodiment also includes a cap 140 that is configured to seal the access port 14 of the clean-out tee 12. In particular, the opening 144 that extends through the cap 140 is configured to slide over an outer surface of the second portion 116 of the angled connection member 112. As such, once the pipe sealing assembly 102 is in place, the cap 140 may be rotated via the flanges 146 such that the threaded portion 142 of the cap 140 may screw into the threaded portion 13 of the clean-out tee 12, thus sealing the clean-out access port 14. To facilitate sealing along the outer surface of the angled connection member 112, the cap 140 of the depicted embodiment includes a cap sealing member 148 that is located proximate the opening 144. In the depicted embodiment the cap sealing member 148 is held in place with a groove 150 located proximate the opening 144 of the cap 140. As such, the cap sealing member 148 seals the outer surface of the angled connection member 112 while also allowing the cap 140 to slide along the outer surface of the angled connection member 112. Although other embodiments need not include a cap sealing member 148, in the depicted embodiment, the cap sealing member 148 is an o-ring constructed of a natural rubber material. In other embodiments the cap sealing member 148 may be any device configured to seal the outer surface of the angled connection member 112.

Once the valve 110 is in a closed position such that the sealing assembly 102 has sealed a portion of the pipe section 10 and the cap 140 has sealed the access port 14, test media may be introduced into the pipe section 10 and testing may begin. In some testing applications, the mechanical test plug 100 may be subjected to tens to hundreds of feet of test media (such as water) which may be located directly above the mechanical test plug 100 in the pipe section 10. After testing, it may be desired to remove the mechanical test plug 100 from the pipe section 10 by first releasing the test media to the other portions of the pipe section 10.

Figure 4:
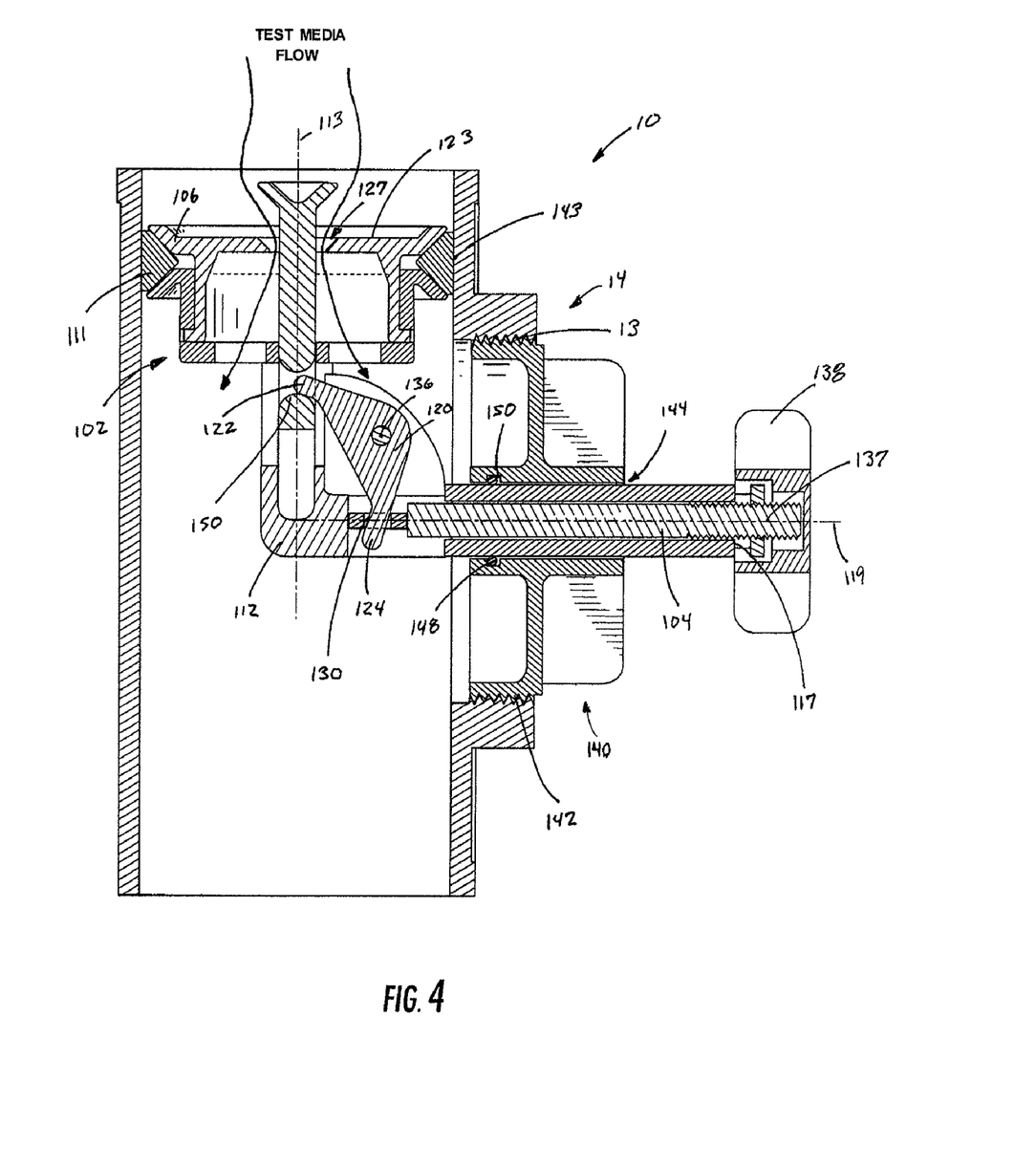
FIG. 4 is a cross-section view of the mechanical test plug of FIG. 2 shown with the valve moved to an open position which allows test media to flow into the lower portion of the pipe section in accordance with one exemplary embodiment of the present invention.

FIG. 4 shows a cross-section view of the mechanical test plug 100 of FIG. 2 shown with the valve 110 moved to an open position. To move the valve 110 to the open position, the threaded device 138 is rotated in an opposite direction such that the actuating member 104 slides along the actuating member axis 119 inside the angled connection member 112 to the left in the orientation shown in the figure. As such, the lever 120 rotates about the lever axis 136 in a clockwise direction, which moves the valve 110 in an upward direction along the valve axis 113. As the valve 110 moves in an upward direction, the valve end 121 unseals the opening 127 in the top surface 123 of the first plate 106, which allows the test media to flow through the first plate 106 and through the openings 133 of the second plate 108. As a result, the test media flows from the portion of the pipe section 10 above the sealing assembly 102 to the portion of the pipe section 10 below the sealing assembly 102, thus relieving pressure from the first plate 106. Due to the presence of the cap 140 in some embodiments, the test media may be prevented from splashing through the access port 14 or otherwise leaking out of the clean-out tee 12. Once the test media has drained through the sealing assembly 102 and pressure is relieved from the first plate 106, the sealing member may contract to a relaxed position (as shown in FIG. 2) forcing the first plate 106 to move away from the second plate 108. In such a manner, the mechanical test plug 100 may be removed from the pipe section 10 by rotating the cap 140 to unseal the access port 14 and by guiding the sealing assembly 102 back through the access port 14 and out of the pipe section 10.

Many modifications and other embodiments of the invention set forth herein will come to mind to one skilled in the art to which this invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A test plug for use with a clean-out that defines a clean-out axis, the clean-out extending at an angle from a pipe section that defines a pipe section axis, the pipe section further defining an internal surface, said test plug comprising:

a first plate having a top surface defining an opening;

a second plate having a bottom surface defining an opening;

a compressible ring-shaped sealing member defining a perimeter contact surface, the sealing member located between the first and second plates;

a valve defining a valve end, the valve being configured to move along a valve axis within the opening defined in the top surface of the first plate; and an actuating member coupled to the valve and configured to move along an actuating member axis, wherein the actuating member axis extends at an angle from the valve axis, and wherein the actuating member is configured to move the valve between an open position, in which test media may be communicated through the opening in the first plate and through the opening in the second plate, and a closed position, in which the valve end seals the opening of the first plate and draws the first and second plates together such that the sealing member is compressed between the first and second plates and extends outwardly to seal against the internal surface of the pipe section.

2. The test plug of claim 1, wherein the valve axis substantially aligns with the pipe section axis and the actuating member axis substantially aligns with the clean-out axis.

3. The test plug of claim 1, further comprising a lever configured to couple the actuating member to the valve such that linear motion of the actuating member along the actuating member axis imparts linear motion of the valve along the valve axis.

4. The test plug of claim 3, wherein the lever defines a first end configured to engage the valve and a second end configured to engage the actuating member, and wherein the lever is further configured to rotate about a lever axis.

5. The test plug of claim 4, wherein at least one of the valve and the actuating member includes cam surfaces configured to contact the respective first or second ends of the lever.

6. The test plug of claim 1, wherein each of the first plate and the second plate includes a radially disposed angled contact surface that is axially tapered, wherein the compressible ring-shaped sealing member is located between the angled contact surfaces of the first and second plates, and wherein when the first and second plates are drawn together the sealing member is compressed between the angled contact surfaces.

7. The test plug of claim 1, wherein the valve end defines a countersunk profile and wherein the opening defined in the top surface of the first plate is configured to receive the countersunk valve end.

8. The test plug of claim 1, wherein the actuating member axis extends approximately 90 degrees from the valve axis.

9. The test plug of claim 1, wherein the sealing member is constructed of an elastomeric material.

10. The test plug of claim 1, further comprising an angled connection member that defines a first portion and a second portion, wherein the first portion defines a first end that is rigidly attached to the second plate, and wherein the actuating member travels within an opening extending through at least a portion of the second portion of the connection member.

11. The test plug of claim 10, wherein one end of the actuating member defines a portion that is configured to receive a threaded device, and wherein the threaded device is configured when rotated to move the actuating member along the actuating member axis.

12. The test plug of claim 10, further comprising a cap configured to seal the clean-out.

13. The test plug of claim 12, wherein the cap defines an opening extending through the cap, wherein the second portion of the connection member further defines an outer surface, and wherein the cap is configured to slide along at least a portion of the outer surface of the second portion of the connection member.

14. The test plug of claim 12, wherein the clean-out defines an inner surface, a portion of which is threaded, and wherein the cap is configured to screw into the threaded portion to seal the clean-out.

15. The test plug of claim 13, wherein a cap sealing member is located proximate the opening of the cap, and wherein the cap sealing member is configured to seal the outer surface of the second portion of the connection member.

16. The test plug of claim 15, wherein the cap sealing member comprises an o-ring constructed of an elastomeric material.

* * * * *